(12) United States Patent
Chestnut et al.

(10) Patent No.: US 7,464,067 B2
(45) Date of Patent: Dec. 9, 2008

(54) OBJECT MONITORING AND MANAGEMENT SYSTEM

(75) Inventors: William Chestnut, Calgary (CA); Jane Glendon, Calgary (CA)

(73) Assignee: Hotbutton Solutions Inc., Calgary, Alberta (CA)

( * ) Notice: Subject to any disclaimer, the term of this patent is extended or adjusted under 35 U.S.C. 154(b) by 1010 days.

(21) Appl. No.: 10/118,927

(22) Filed: Apr. 10, 2002

(65) Prior Publication Data

US 2003/0195904 A1 Oct. 16, 2003

(51) Int. Cl.
- G06F 7/00 (2006.01)
- G06F 17/30 (2006.01)
- G06F 17/00 (2006.01)
- G06F 12/00 (2006.01)
- G06F 15/16 (2006.01)

(52) U.S. Cl. .............. 707/1; 707/10; 707/100; 707/104.1; 707/201; 709/219; 709/248

(58) Field of Classification Search .......... 707/100, 707/104.1, 201; 709/219, 248
See application file for complete search history.

(56) References Cited

U.S. PATENT DOCUMENTS

| | | | | |
|---|---|---|---|---|
| 4,920,488 A | 4/1990 | Filley | | 364/403 |
| 5,142,128 A | 8/1992 | Perkin et al. | | 235/375 |
| 5,360,967 A | 11/1994 | Perkin et al. | | 235/375 |
| 5,684,990 A | 11/1997 | Boothby | | 395/619 |
| 5,884,322 A | 3/1999 | Sidhu et al. | | 707/200 |
| 5,924,096 A | 7/1999 | Draper et al. | | 707/10 |
| 6,014,628 A | 1/2000 | Kovarik, Jr. | | 705/1 |
| 6,339,397 B1 * | 1/2002 | Baker | | 342/357.07 |
| 6,347,292 B1 | 2/2002 | Denny et al. | | 702/188 |
| 6,401,079 B1 * | 6/2002 | Kahn et al. | | 705/30 |
| 6,480,811 B2 | 11/2002 | Denny et al. | | 702/188 |
| 6,507,868 B2 * | 1/2003 | Simmon et al. | | 709/219 |
| 6,577,241 B2 * | 6/2003 | Neidig et al. | | 340/573.3 |
| 6,934,532 B2 * | 8/2005 | Coppinger et al. | | 455/412.1 |
| 2002/0147850 A1 * | 10/2002 | Richards et al. | | 709/248 |
| 2002/0194081 A1 * | 12/2002 | Perkowski | | 705/26 |
| 2003/0088442 A1 * | 5/2003 | Michael et al. | | 705/3 |
| 2003/0120546 A1 * | 6/2003 | Cusack et al. | | 705/16 |
| 2003/0154135 A1 * | 8/2003 | Covington et al. | | 705/26 |

FOREIGN PATENT DOCUMENTS

| | | |
|---|---|---|
| WO | WO 96/27171 | 6/1996 |
| WO | WO 01/33759 | 10/2001 |

* cited by examiner

*Primary Examiner*—Debbie M Le
*Assistant Examiner*—Harold A Hotelling
(74) *Attorney, Agent, or Firm*—Kent Daniels; Blake, Cassels & Graydon LLP

(57) ABSTRACT

An object management system permits companies/organizations to grant access to third parties to partitioned subsets of a central database to enable completely paperless asset or process management. The central database can be used simultaneously by a plurality of companies/organizations, third party service providers and/or regulatory authorities, without compromise of data security. Data is partitioned on an Issuing Unit basis. Each Issuing Unit is enabled to autonomously generate primary keys. The relationship of Issuing Unit Group to managed objects is a may-to-many relationship to enable ultimate flexibility in data partitioning.

21 Claims, 10 Drawing Sheets

| Record | Company | Class | Attribute | Vessel Inspector View | Pump Service View | Company 1 View | Company 2 View |
|---|---|---|---|---|---|---|---|
| Record 1 | Company 1 | Vessel | 121a | ✓ | | ✓ | |
| Record 2 | Company 1 | Vessel | 144e | ✓ | | ✓ | |
| Record 3 | Company 1 | Vessel | 133q | ✓ | | ✓ | |
| Record 4 | Company 1 | Pump | 1110t | | ✓ | ✓ | |
| Record 5 | Company 2 | Vessel | 77v | ✓ | | | ✓ |
| Record 6 | Company 2 | Vessel | 84v | ✓ | | | ✓ |
| Record 7 | Company 2 | Pump | 31p | | ✓ | | ✓ |
| Record 8 | Company 2 | Pump | 65p | | ✓ | | ✓ |

OBJECT MONITORING AND MANAGEMENT SYSTEM

CROSS-REFERENCE TO RELATED APPLICATIONS

This is the first application filed for the present invention.

MICROFICHE APPENDIX

Not applicable.

TECHNICAL FIELD

The present invention relates to computerized systems for monitoring and managing physical assets or other objects and, in particular, to a system for enabling paperless, cross-entity identification, monitoring and management of the physical assets or other objects to which a computer-readable identification tag can be affixed.

BACKGROUND OF THE INVENTION

Various inventory and asset management systems have been developed for industrial use, because such systems have become an essential part of many industrial operations. Industries such as manufacturing, ore mining and processing, oil and gas procurement, refining and distribution need to track not only manufactured goods or produced materials during warehousing but also equipment that is used for production, distribution, etc. Existing inventory systems generally apply the same algorithms for warehousing and equipment tracking. However, the process of equipment tracking is much more complicated than that of warehousing merchandise or products. A warehouse inventory system typically tracks an object or a group of objects, each object or group being marked by a distinguishing identification tag readable by a device that is coupled directly or indirectly to a computer. The computer maintains a database with a number of records that describes the tracked objects.

Many methods of object monitoring and management are taught in the prior art. They are used in variety of industries, including manufacturing, health care facilities, libraries, etc. The main purpose of these prior art methods is to provide an instrument for effective asset management.

An example is U.S. Pat. No. 4,920,488 entitled PHYSICAL INVENTORY SYSTEM, which issued to Filley on Apr. 24, 1990. Filley describes a digital computer data base system and method for tracking a physical inventory that consists of land and fixtures, and items in or on the land, such as buildings, oil wells, pumps, and items within the buildings. In addition, the patent provides a system for tracking not only an inventory of each item, but also its physical location with respect to a geographical location of the item.

Another example is U.S. Pat. No. 6,014,628 entitled METHOD AND SYSTEM FOR TRACKING ANY ENTITY THROUGH ANY SET OF PROCESSES UTILIZING A TEMPORAL PROJECTION, which issued to Kovarik, Jr. on Jan. 11, 2000. Kovarik describes a method and system for a generic representation of a tracking domain that can be applied to new tracking applications with minimal development of new software. The patent describes a system having an overall architecture in which common abstractions are coalesced into a common design and architecture. The components of the system provide a foundation for applying tracking systems for one particular purpose to other application areas, e.g. the system can be adapted for a tracking system to provide aircraft security, or a tracking system for the manufacture of auto parts.

A disadvantage of all known prior art inventory tracking and asset management systems is that they fail to provide mechanisms for secure cross-entity access to asset management information. Consequently, truly "paperless" modes of operation have been impossible. Effective asset management inevitably involves the interaction of a plurality of autonomous, or semi-autonomous entities. For example, in an oil or gas production facility, the management of production equipment such as wellhead equipment, storage vessels, pipelines, etc. requires cooperative interaction of owner's personnel, maintenance service providers, regulatory inspectors, insurers, etc. In the past, these interactions have been documented, verified and accounted for using bulky paper systems that are expensive to provision and maintain, and often difficult to understand. Of course, paper systems are also difficult to correlate, search and audit.

There therefore exists a need for a completely computerized system for identifying and tracking physical assets or other objects and managing all activities associated with those assets, including shipment, transfer of ownership, inspection, maintenance, logging, calibrating, scheduling, repair, etc. In addition, the system preferably enables tracking of a physical location of the respective assets.

SUMMARY OF THE INVENTION

The present invention therefore provides a system for monitoring and managing objects. The system comprises a central database for storing information used to track objects wherein each object is identified by a unique computer-readable identifier, the central database being structured to enable an entity to retrieve, write and modify information about objects that the entity owns. The central database is further structured to permit a plurality of third parties to retrieve information from the central database on cross-entity basis, to enable object tracking, maintenance, inspection and other procedures by third party service providers, regulators, etc.

The present invention also provides a method for monitoring and managing objects. The method comprises steps of identifying objects to be tracked by attaching to each object a unique computer readable identifier; storing information in a central database that is used to track the objects; providing access to the database by an entity to retrieve, write and modify information about objects that an entity owns; and providing access to a plurality of third parties to create, retrieve or modify information in the database on cross-entity basis, to enable object tracking, maintenance, inspection and other procedures by third party service providers, regulators, etc.

In accordance with a further aspect of the invention, the method comprises a step of providing a secure connection between the database and a plurality of entities and third parties using a gateway to provide structured information related to a tracked object.

In accordance with a further aspect of the invention, the information about the object in the central database is stored it a plurality of tables having a standardized set of attributes.

In accordance with a further aspect of the invention, each table is identified using a unique primary key that is in the same format for all tables.

In accordance with another aspect of the invention, a portable unit is operated to read the computer readable identifier that is attached to the tracked objects. Programmed processes execute on the portable unit to perform one of creating, writing and modifying a database record that is associated with the tracked object in the portable unit. The portable unit is either placed in a docking station or is equipped with radio communications to permit the portable unit to establish a connection with the central database for the purpose of synchronizing a subset of records in the central database with a database of records maintained by the portable unit. The portable unit establishes a connection with the central database and records are transferred to, or retrieved from the central database.

In accordance with another aspect of the invention, the method comprises a step of operating the portable unit to generate the unique key associated with a specific object to be tracked by concatenating a first string that is uniquely associated with the portable unit and a second string that is generated by the portable unit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a computerized object monitoring and management system that enables comprehensive paperless tracking, maintenance and/or management of physical assets. The system permits owners of the assets to control access to records so that maintenance service providers, regulatory authorities, and other third parties have access to information required for their respective functions on a cross-owner basis.

Figure 1:
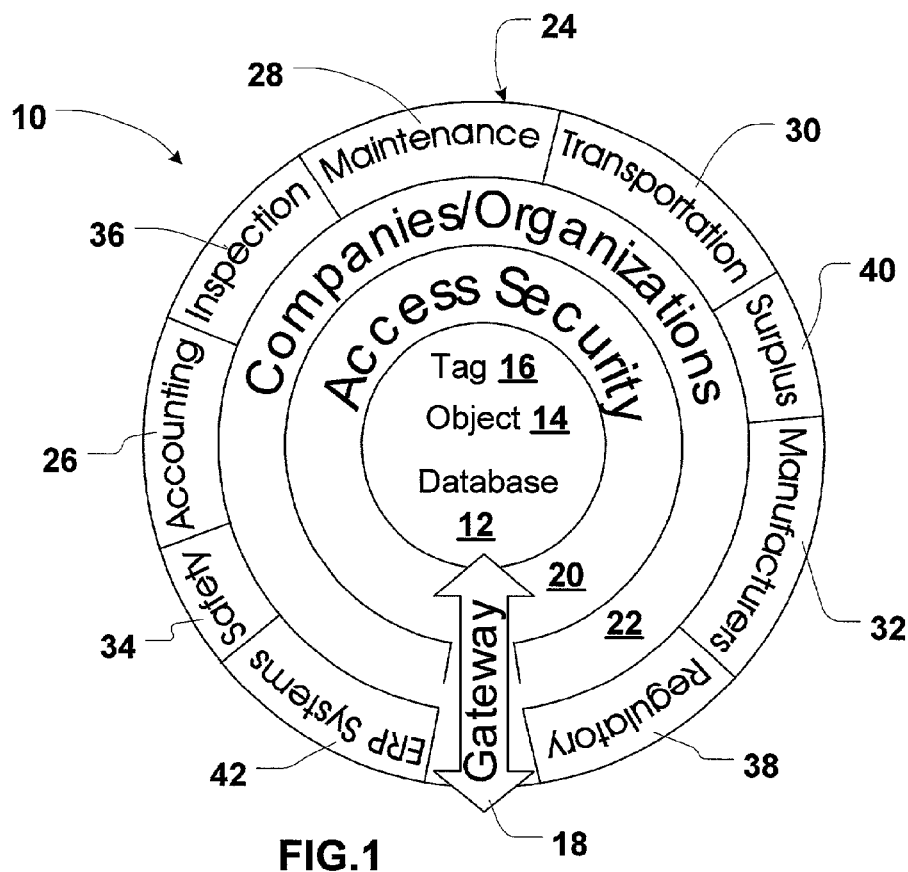
FIG. 1 is a schematic diagram illustrating an object monitoring and management system in accordance with the invention, and users of the system.

FIG. 1 is a conceptual diagram that schematically illustrates an object monitoring and management system 10 in accordance with an embodiment of the invention. A globally accessible database 12 stores information about monitored objects 14. Each object 14 is identified by a physically attached computer readable identifier (e.g. a tag, barcode, or the like) 16. The database 12 is accessed via a gateway 18 that serves as a secure entry channel. Access to the database is restricted by a security layer 20, such as a firewall and/or other access control systems. The company/organization layer 22 represents entities that use the system for the propose of monitoring and managing objects they own, possess or control. The companies/organizations access the database 12 through the gateway 18 and security layer 20. Each company/organization 22 only has access to records in the database 12 related to monitored objects 14 that it owns, possesses or controls. A company/organization that is granted access to the system 10 can retrieve, write or modify records related only to its own objects. Each company/organization can have objects in one or more locations.

Another category of users of the system 10 are third parties, which are not owners of the objects 14 that are monitored by the system 10. The third parties represented by layer 24 of FIG. 1 include, for example, service providers and regulators such as the accounting firms 26, maintenance providers 28, transportation providers 30, manufacturers 32, safety inspectors 34, government inspectors 36, regulatory agencies 38, surplus brokers 40, enterprise resource planners (ERP) 42, and others such as insurers, etc. The third parties operate and/or cooperate with the companies/organizations 22, to provide services required to manufacture produce, maintain, distribute or account for the objects. Each entity in the company/organization layer 22 can also control access to information in the database 12 by its own departments, divisions or regional offices. For example, a department that is responsible for enterprise resource planning may be granted access only to information about objects 14 related to equipment surplus 40 and information required by the Enterprise Resource Planning (ERP) system 42.

Figure 2:
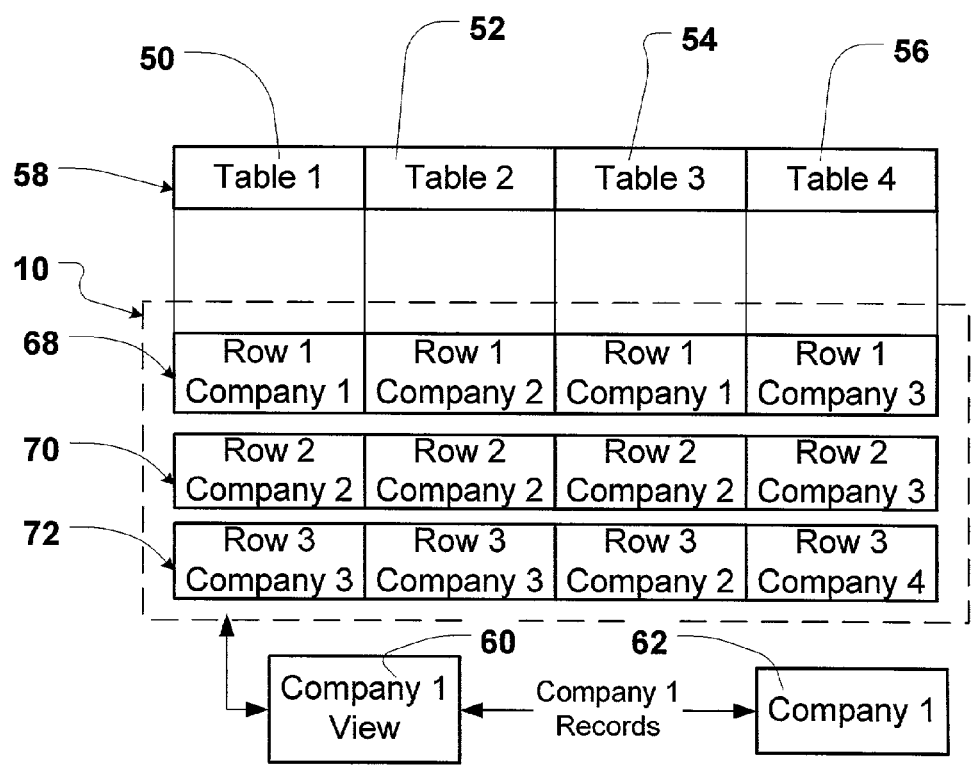
FIG. 2 is a block diagram that schematically illustrates an example of a scope of access of each object owner to records in the database of the system illustrated in FIG. 1.

FIG. 2 schematically illustrates the structure of the company/organization 22 access to the database 12. The database 12 is organized in a plurality of tables: "Table 1" 50, "Table 2" 52, "Table 3" 54, and "Table 4" 56. Each table in the database 12 stores a number of records respectively arranged in table rows, which are schematically illustrated as rows 68, 70 and 72. The respective records store information about particular objects belonging to particular ones of the respective companies/organizations 22. Each company/organization 22 can create, retrieve, update, and modify information about objects 14 that it owns. The respective companies can only operate within the boundaries of the information related to their own objects 14. Each record in the database stores information about one object 14 that belongs to the company/organization 22. A filter, such as database "view" 60 for Company 1 controls a scope of access to the database 12 by the Company 1. Each company/organization 22 has a "view" that controls the company's access to records in the database 12, in a manner well known in the art. In the example shown, "Company 1" 62 can only access the records in "row 1" 68 of "table 1" 50 and "row 1" 68 of "table 3" 54.

Figures 3, 5:
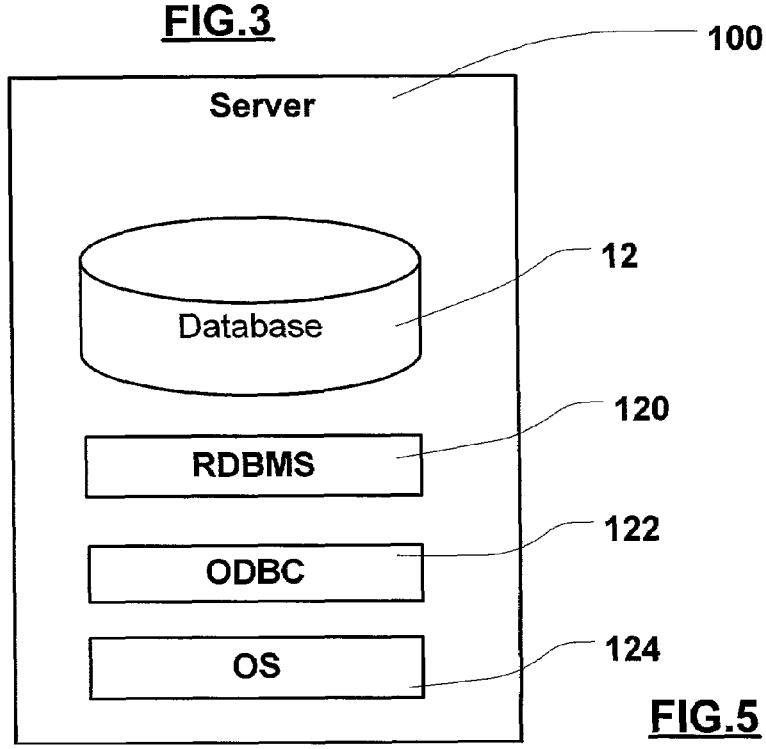
FIG. 3 is a block diagram that schematically illustrates an example of a scope of access by a third party service provider/regulator to predetermined contents of records in the database.
FIG. 5 is a block diagram of software layers required on the server illustrated in FIG. 4.

As explained above, each company/organization 22 that uses the system 10 can grant access to third parties to use the system within the scope of business of the third party. FIG. 3 schematically illustrates a structure of third party access to the database 12. The database 12 is structured to permit any required information about an object to be stored. For example, information that describes a physical condition and location of a monitored object 14 can be stored. Rows 90, which include a record number 50, a company identifier 52, a class attribute 54, and an object attribute 56 in the database 12 shown in a simplified schematic form, store information about objects 14 owned by company 1 and company 2.

In this example, the respective companies have granted access to a vessel inspection agency 36 to read, write or modify vessel inspection records in the database 12. The respective companies have also granted access to pump maintenance records to a pump maintenance service provider. A plurality of views 88 control access to the various records in the database 12. Each view is associated with an issuing unit group, as will be explained below in detail.

The vessel inspection view controls access to records in the database 12, as explained above. Using the view, a vessel inspector is able to create, retrieve and modify the vessel inspection records belonging to both companies 1 and 2, as illustrated by the check marks in the respective boxes associated with record numbers 1-3, 5 and 6. However, the vessel inspection view prevents the vessel inspector from viewing or modifying other records in the database 12. Furthermore, the database 12 may contain many other records (not shown) containing information about the vessels that are not vessel inspection records, and to which the vessel inspector has no access.

The pump service view permits a pump serviceman to create, retrieve and modify the pump maintenance records (record numbers 4, 7 and 8) related to pumps owned by both companies 1 and 2, as indicated by the check marks in boxes associated with the respective records 4, 7 and 8. The pump serviceman cannot, however, access any of the vessel inspection records, or any other records in the database 12 aside from the pump service records. As also shown, the recpective company 1 and company 2 each have views that permit them to view any record in the database 12 assocaited with objects they respectively own. It should be understood that the database 12 may serve other companies that have not granted access to their records to the vessel inspection agency or the pump manienance service. In that case, neither the vessel inspector nor the pump serviceman would have access to any of their company records, regardless of whether they were vessel inspection or pump service records. Consequently, the system in accordance with the invention permits controlled cross-entity access to facilitate regulatory, inspection, maintenance and other business procedures, as explained above with reference to FIG. 1.

Figure 4:
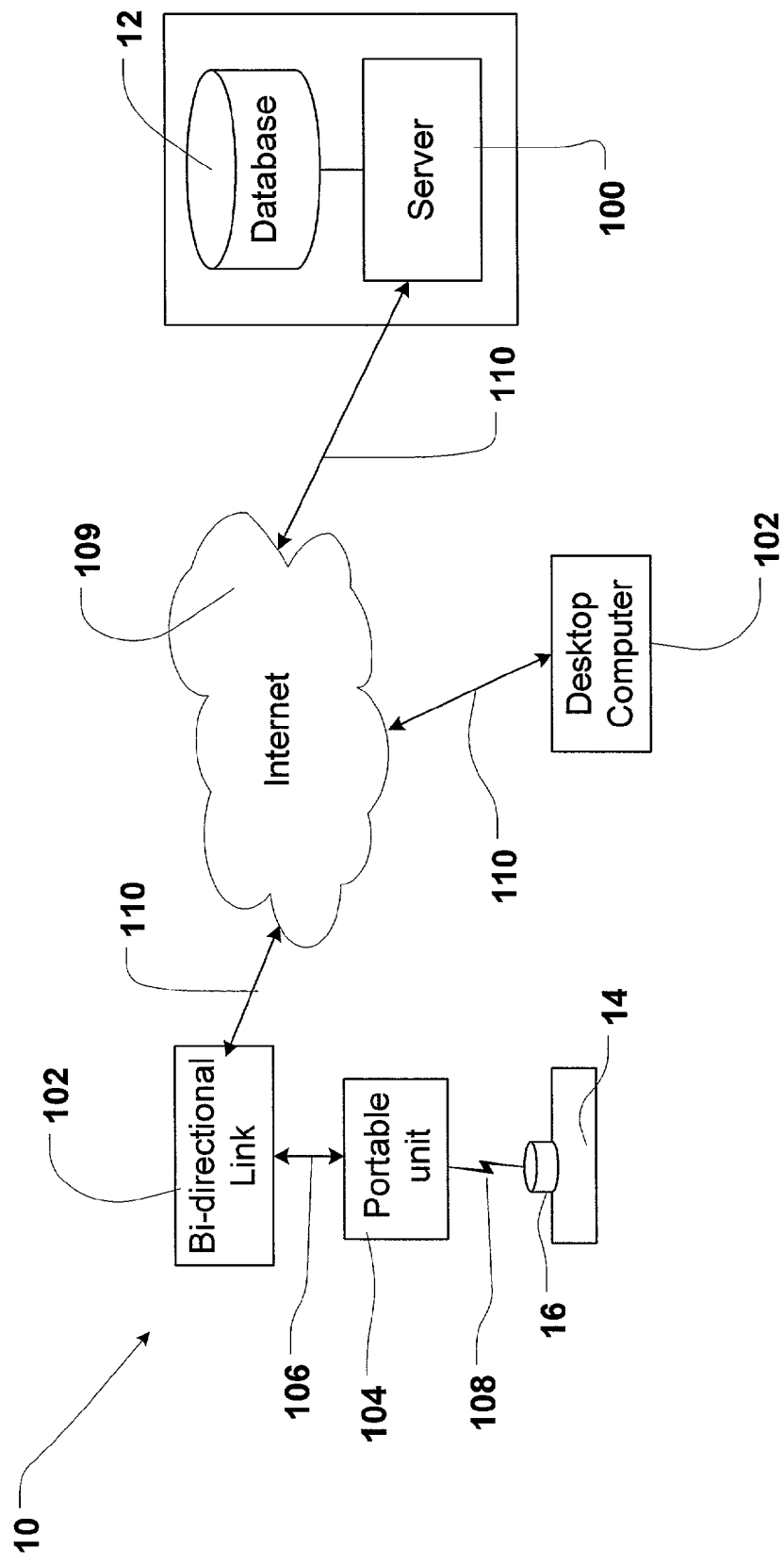
FIG. 4 is a schematic diagram of an exemplary embodiment of the object monitoring and management system illustrated in FIG. 1.

FIG. 4 schematically illustrates an embodiment of the object monitoring and management system 10. This embodiment of the object monitoring and management system 10 includes a server 100 that provides the secure gateway 18 (FIG. 1) to the database 12. The system 10 further includes desktop computers 102, handheld portable units 104, and object tags 16. The portable units 104 communicate with the server 100 through a bi-directional link 102, which may be, for example, a desktop computer with a parallel or universal systems bus (USB) port to which the portable unit is connected by a docking station or a cable connector; a modem connected to a personal digital assistant (PDA) or a cellular telephone; a wireless link; or any other interface for providing a connection directly or indirectly to an open network such as the Internet 109. The system 10 is adapted to monitor objects 14 that are uniquely identified by an object tag 16, which is physically affixed to the object 14. The object tag 16 can be any computer readable identifier. In one embodiment, objects 14 to be monitored are identified by a computer readable identifier known as an iButton® that is manufactured by Dallas Semiconductor. The iButton® is a computer readable chip encased in a dime-sized stainless steel case. This type of computer readable tag can operate within a wide range of temperatures and environmental conditions. In comparison to other types of computer readable object tags 16, for example a printed bar code, the iButton® is more robust. However, the object tag 16 is selected to meet the tracking requirements and any suitable computer-readable tagging system can be used with equal success. A computer readable object tag 16 is attached to, printed on or otherwise affixed to each object 14 that is owned by the company/organization that uses the system 10 for monitoring and managing their objects.

The portable units 104 are the principal tool used for monitoring objects. The portable units 104 are handheld computers adapted to read information recorded in or on the object tag 16. The portable units 104 run software applications that maintain respective portable databases, and connect with server 100 using, for example, a serial port or a universal system bus (USB) connection 106 to the bi-directional link 102. As used in this document, the term "desktop computers" 102 means any computing machine or appliance adapted to connect with the server 100 via the Internet 109 by connection 110, and to transfer information between the connected portable unit 104 and the server 100. The server 100 maintains the database 12 that stores information about objects belonging to the companies/organizations that use the system 10 and, in addition, provides secure authorized access to the database 12 by the desktop computers 102.

As shown in FIG. 5, the server 100 includes an operating system 124, an open database connectivity (ODBC) application 122, and a relational database management system (RDBMS) 120.

Figure 6:
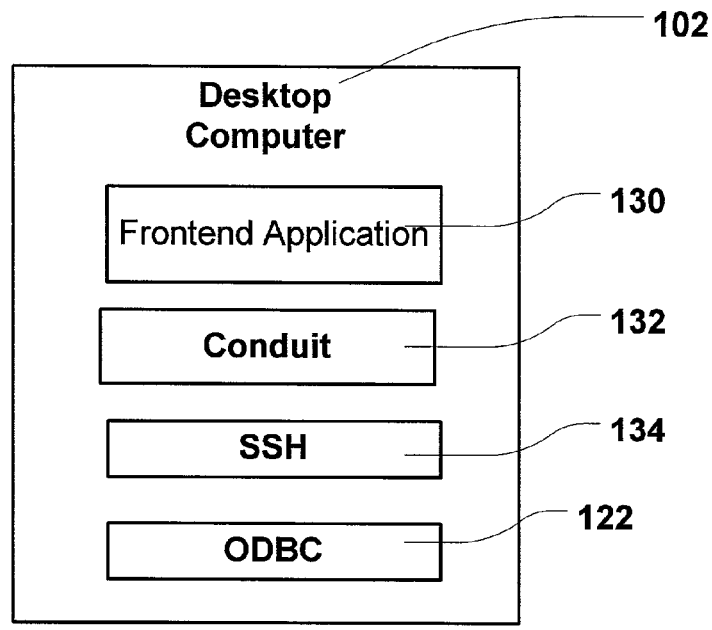
FIG. 6 is a block diagram of software layers required on the desktop computers illustrated in FIG. 4.

As shown in FIG. 6, the desktop computers 102 are provisioned with front-end software 130, a conduit application 132, a secure shell 134, and an open database connectivity (ODBC) application 122. In one embodiment of the invention, these components interact with the server 100 and the portable units 104. The server 100 is, for example, accessed through the Internet by the front-end application 130. Data transmission is ported through a data encryption utility of the secure shell 134, and decrypted by the server 100. Object management and tracking data is not stored on the desktop computer 102. The database connectivity is provided by standard connectivity software such as ODBC, an object linking and embedding database (OLE DB), or ActiveX® Data Objects (ADO).

Figure 7:
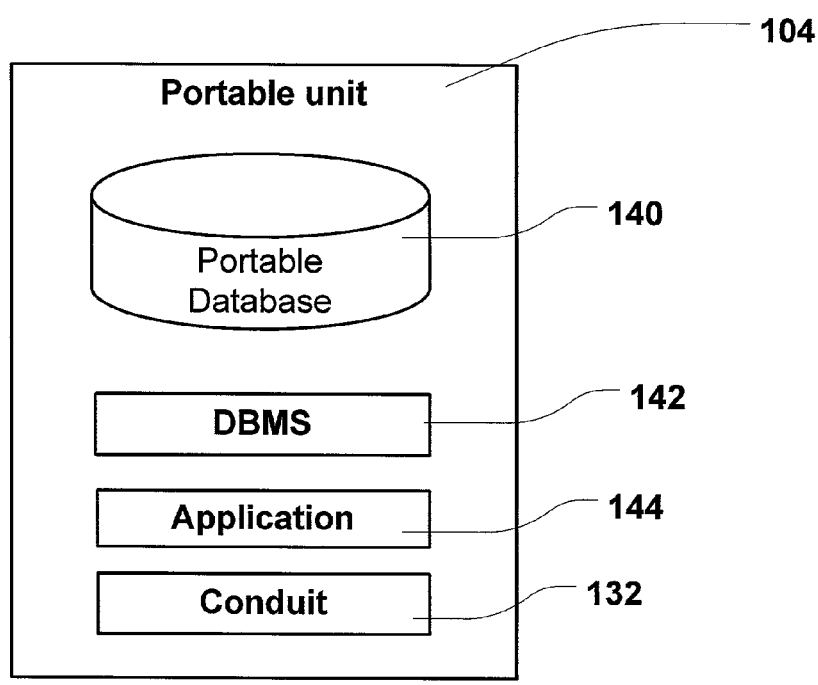
FIG. 7 is a block diagram of software layers required on portable units illustrated in FIG. 4.

As shown in FIG. 7, the portable unit 104 is provisioned with a portable database 140, a conduit application 132, a database management system (DBMS) 142 and a data management and tracking application 144. Although the portable units 104 in the embodiment described below are not wireless devices, it should be understood that the invention contemplates and encompasses the use of wireless portable units 104 that are adapted to communicate wirelessly with the server 100.

In an embodiment of the invention, the central database 12 is a relational database that stores information about monitored objects organized as a plurality of tables. Each table consists of a plurality of records having a standardized set of attributes, and each record is accessed by a unique primary key that has the same format across all of the tables. The database scheme is sufficiently abstracted and standardized to provide the flexibility required to permit the system 10 and control database 12 to be adapted to different areas of use without redeploying the system 10.

Table 1 shows the basis of the standardized database schema. The "ObjectId" attribute is the standardized primary key that is associated with monitored objects. The "ParentObjectId" attribute is used in a variety of standard relationships the require a single foreign key link to another table, and, in recursive relationships, to the relation itself. A master detail relationship can be represented by two tables that are immediately connected by storing the "ObjectId" of the master relation in the "ParentObjectId" of the detail relation. The "Created" and "LastModified" attributes are timestamps and are used in every table to respectively record a date and time that the record was created, and the date and time of a most recent update. The "ObjectNametag" attribute is a standardized object name used primarily for standardized presentation in lists, which are displayed for browsing and searching. Since most object classes require that a user have a facility for browsing and searching, including the ObjectNametag attribute eliminates the inconvenience of planning for it in each object class.

TABLE 1

Template

| Name | Characteristics |
| --- | --- |
| ObjectId | character (10) |
| ParentObjectId | character (10) |
| ObjectNametag | character (50) |
| LastModified | timestamp |
| LastModifiedBy | character (10) |
| CreatedBy | character (10) |
| Created | timestamp |
| OrgId | character (10) |
| CreatedByIUID | character (10) |
| LastModifiedByIUID | character (10) |

The "OrgId" attribute in the table schema in each table across the system enables the storage of all records of one class for all companies/organizations that are users of the system in a single table, but presents to each company/organization only its own records. When a company/organization accesses or modifies its records, the records in the table are filtered by the system on the basis of the attribute "OrgId" that, as described above, is a key and is associated with the company/organization that owns the object. As will be explained below in detail, issuing unit groups are associated with a key value (OrgId) that identifies a company/organization and, thus, the system is able to provide the company/organization with access to only its own records. In addition, third parties use issuing units associated with other attributes of the database schema, such as location or asset class, to access the records in the database simply by filtering on those attributes directly, without filtering the database on the "OrgId" attribute. This permits third parties such as inspection, maintenance, insurance and regulatory agencies access records in the database on a cross-entity basis. It should be understood, however, that each company/organization defines its own issuing unit groups and therefore controls which third parties have access to their records, as well as the scope of access of each third party.

Attributes "CreatedByIUID" and "LastModifiedByIUID" are associated with a portable unit 104 or the desktop computer 102 that created the record, or and modified it. The value of these respective attributes is used as a foreign key to a registry table for these units 104.

Attributes "CreatedBy" and "LastModifiedBy" store an identity of a user who created and a user who most recently modified the record. The value of these respective attributes is used as a foreign key to a user table.

In addition to the above-described attributes of a standardized scheme of the database 12, each table contains attributes that characterize a monitored object that are used to compile a description of the object. For example, Table 2 stores information about object location.

TABLE 2

Location

| Name | Characteristics |
| --- | --- |
| ObjectId | character (16) |
| ParentObjectId | character (16) |
| ObjectNametag | character (30) |
| LastModified | timestamp |
| LastModifiedby | character (16) |
| CreatedBy | character (16) |
| Created | timestamp |
| LocationTreeid | character (16) |
| LocationTreeSeq | integer |
| LocationDesc | character (20-48) |
| LocationType | character (16) |
| OrgId | character (16) |
| LocLSD | integer |
| LocSection | integer |
| LocTownship | integer |
| locrange | integer |
| LocMeridian | character (2) |
| LocLongDeg | integer |
| LocLongMin | integer |
| LocLongSec | integer |
| LocLongdesc | character (30) |
| LocLatDeg | integer |
| LocLatMin | integer |
| LocLatsec | integer |
| LocLatdeSc | character (30) |

In order to provide a standardized scheme for each table structure, the attributes "ObjectId", "ParentObjectId", "Created", "LastModified", "ObjectNametag", "OrgId", "CreatedBy", and "LastModifiedBy" are included in Table 2. However, the attributes "CreatedByIUID", and "LastModifiedByIUID" are not included.

The remainder of the attributes of the table 2 (location)— "LocationTreeid", "LocationTreeSeq", "LocationDesc", "LocationType", "LocLSD", "LocSection", "LocTownship", "locrange", "LocMeridian", "LocLongDeg", "LocLongMin", "LocLongSec", "LocLongdesc", "LocLatDeg", "LocLatMin", "LocLatsec", "LocLatdesc"—store specific information that describes the location of the monitored object 14. In this embodiment, attributes related to location describe the location using geographical coordinates of the object location, such as latitude and Alongitude. The mailing address of the object location is also stored. It should be understood that different attributes may be added to the standardized schema and that attributes can be adapted to define specific characteristics of an object.

Figure 8:
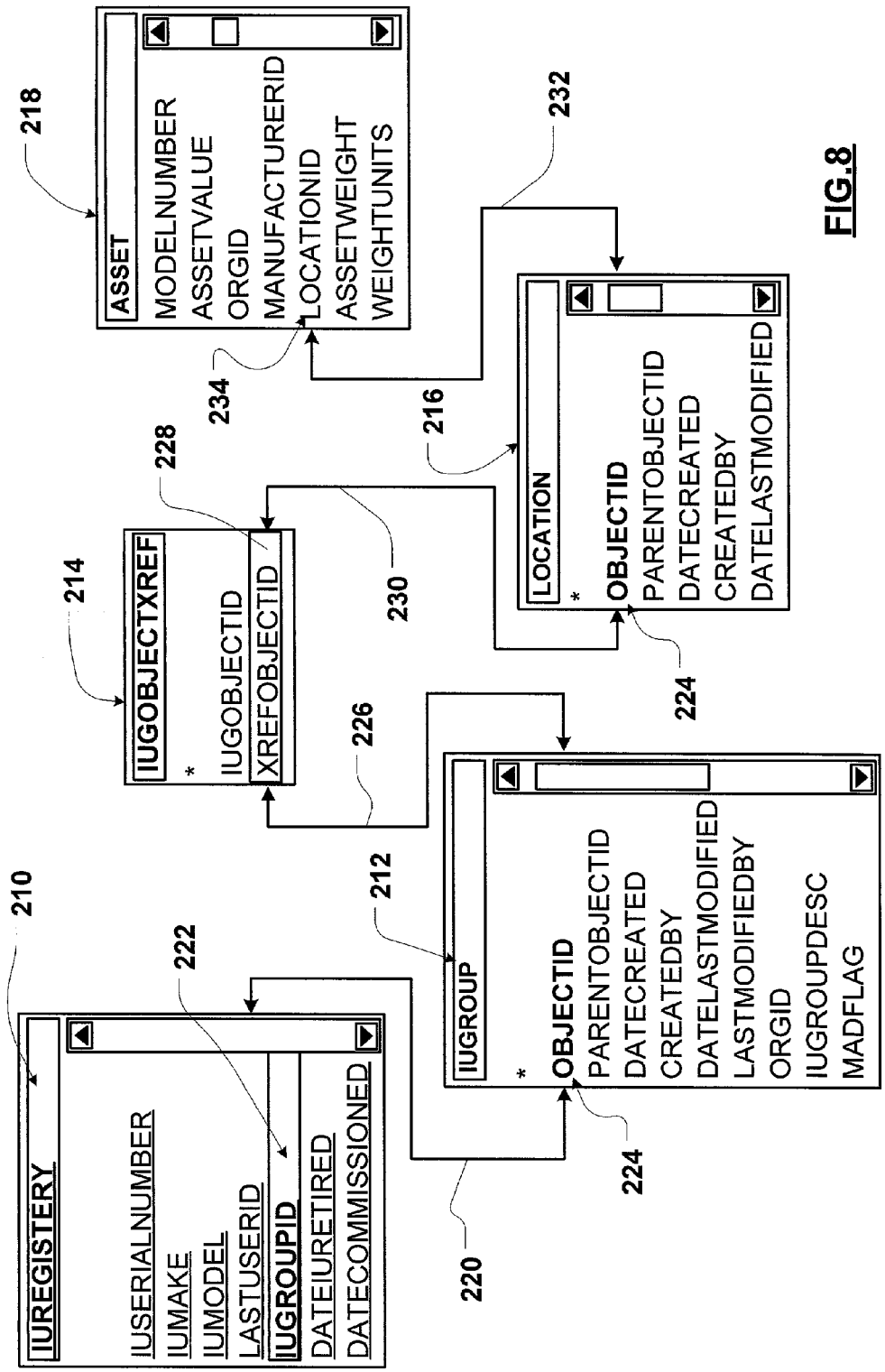
FIG. 8 schematically illustrates joins performed to retrieve data from the database based on object location.

The relational database 12, which includes the plurality of tables, permits information to be extracted from the database using different criteria. As is known in the art, in order to extract information from a relational database, it is necessary to form a query to the database. A query that uses an interrelation within a plurality of tables is known as a join. FIG. 8 illustrates a simplified example 200 of a join between tables IUREGISTRY 210, IUGROUP 212, IUGOJECTXREF 214, LOCATION 216, and ASSET 218. This join is performed to obtain records from the ASSET 218 table. This five-table join also shows some of the standardized attributes of the schema.

Each portable unit 104 has its own record in the Issuing Unit Registry Table "IURegistry" 210 and belongs to one and only one issuing unit group that is stored as an attribute "IUGroupId" 222. The join 220 between the attribute "IUGroupId" 222 in the "IURegistry" table 210 and the attribute "ObjectId" 224 in the "IUGroup" table 212 is then connected by a join 226 to a many-to-many resolving relation table "IUGObjectXREF" 214. In a logical entity diagram the "IUGObjectXREF" table 214 would appear as two entities, since logically there is a first entry for a cross-reference between the "IUGroup" table 212 and the "Location" table 216 as one pair, and a second reference between the "IUGroup" table 212 and the "ASSET" table 218 as another pair. However, the universal primary key that is the attribute "ObjectId" 224 permits both cross-references to be combined physically into a single table and the records are automatically sorted out by the joins. In this case, the attribute "XREFObjectId" 228 joins to the attribute "ObjectId" 224 of the "Location" table 216, which then joins to the "ASSET" table 218 via the foreign key attribute "LocationId" 234 in the "ASSET" table 218.

Figure 9:
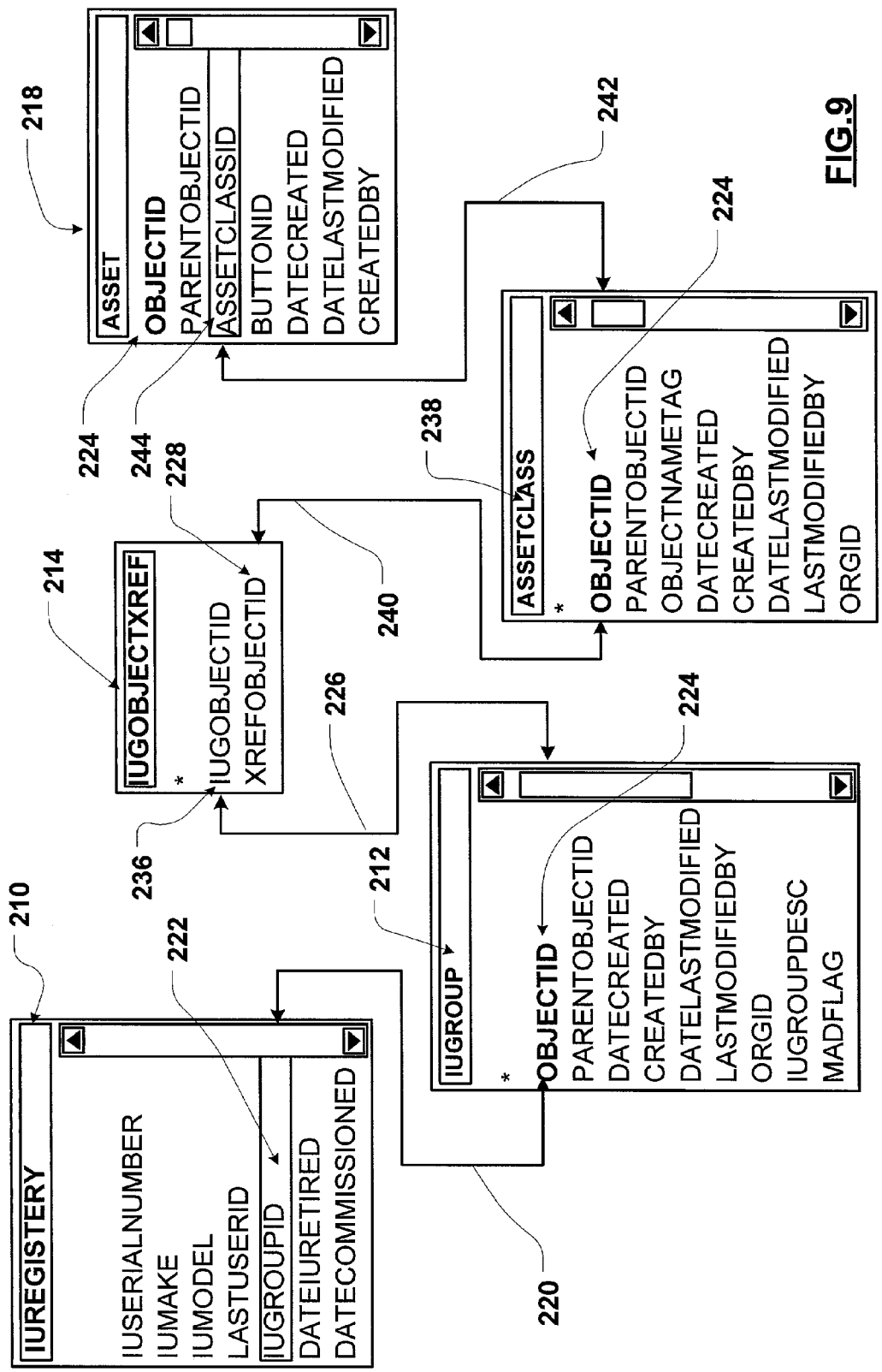
FIG. 9 schematically illustrates joins performed to retrieve data from the database based on object asset class.

Partitioning by the table "ASSETCLASS" 238 instead of by table "Location" 216, as shown in FIG. 8, is shown in FIG. 9. Partitioning by the table "ASSETCLASS" 238 is done in the same way as has been described above with reference to FIG. 8 with the exception that the join is to the "ASSETCLASS" table 238 rather than the "Location" table 216 shown in FIG. 8. In this case, the table "XREFObjectId" 214 relation to the table "ASSETCLASS" 238 selects only those records for the given asset class.

Each portable unit 104, as previously described, has its own record in the issuing unit registry table "IURegistry" 210 and belongs to one and only one issuing unit group, which is stored as an attribute "IUGroupId" 222. The join 220 between the attribute "IUGroupId" 222 in the "IURegistry" table 210 and the attribute "ObjectId" 224 in the "IUGroup" table 212 is then connected by a join 226 to the many-to-many resolving relation table "IUGObjectXREF" 214. In a logical entity diagram the "IUGObjectXREF" table 214 would appear as two entities, since logically there is one for a cross-reference between the "IUGroup" table 212 and the "ASSETCLASS" table 238 as one pair and between the "IUGroup" table 212 and the "ASSET" table 218 as another pair. However, the universal primary key that is the attribute "ObjectId" 224 of the "ASSETCLASS" table 238 permits both tables to be combined physically into one table and the records are automatically sorted out by the joins. In this case, the attribute "XREFObjectId" 228 joins to the attribute "ObjectId" 224 of the "ASSETCLASS" table 238, which then joins 242 to the "ASSET" table 218 via the foreign key attribute "ASSETCLASSID" 244 in the "ASSET" table 218.

Figure 10:
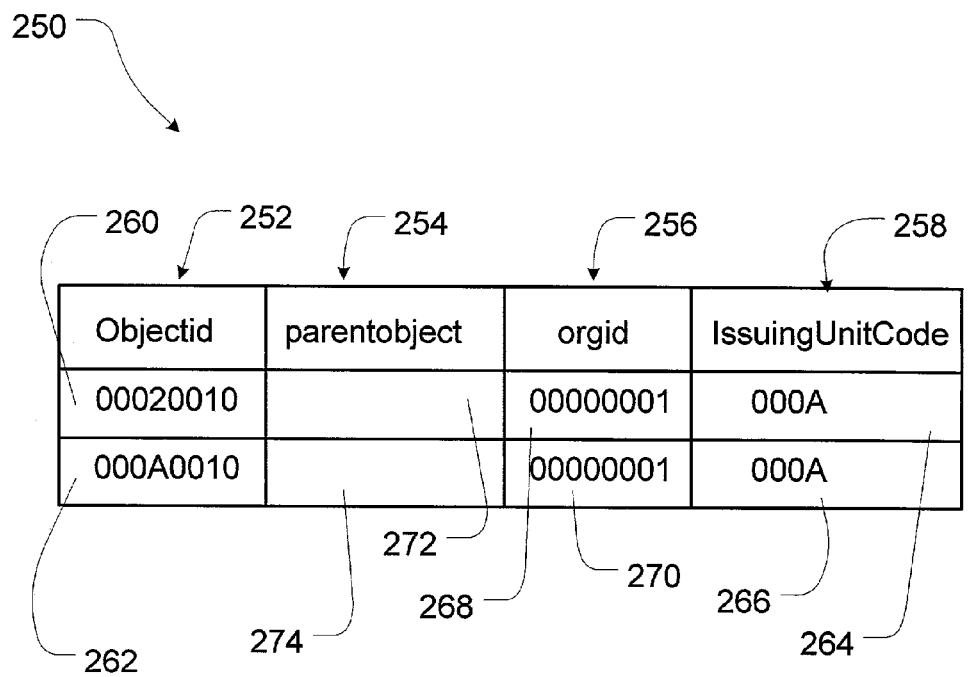
FIG. 10 illustrates an Issuing Unit Registry Table used to store information about issuing units.

The attribute "ObjectId" in the standardized schema of the table structure in the database is a unique primary key that is associated with the objects across all the tables of the database. This embodiment of the invention provides an algorithm for issuing a unique primary key, wherein any issuing unit, such as a portable unit 104 or desktop computer 102 that is authorized to create a record in the database is capable, during the recording of information, of generating a primary key that is ensured to be unique. Each issuing unit is commissioned by the central server and associated with a unique alphanumeric sequence that is a constant for that issuing unit. An example of the table that stores information about issuing units is shown in FIG. 10.

The central database stores a registry of issuing units. The registry table 250 consists of multiple attributes from the standardized table scheme and comprises columns "ObjectId" 252, "ParentObjectId" 254, "OrgId" 256 and "IssuingUnitCode" 258. Each field 260 and 262 in the column "ObjectId" 252 is a primary key, wherein, in this particular example, the data "00020010" of the field 260 uniquely identifies an issuing unit "000A" (field 264). Each of fields 264 and 266 of column 258 "IssuingUnitCode" is the primary key constant for the issuing unit because this 4-character string appears in every record generated by this issuing unit. The content "00020010" of the field 260 "ObjectId" can be interpreted as being a record generated by a different issuing unit, whose primary key constant is "0002". Each of fields 268 and 270 contain coded information that is associated with a name of a company/organization. Field 268 contains "00000001", which identifies a particular company/organization. Fields 272 and 274 of the column 254 "parentobjectid" are empty because issuing units do not have parent objects. The field 262 that contains "000A0010" illustrates an example of the issuing unit registering itself.

Figure 11:
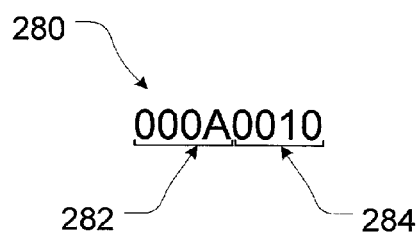
FIG. 11 illustrates an example of a primary key structure that is used in all tables of the database illustrated in FIG. 4.

A primary key 280 shown in FIG. 11 consists of two parts 282 and 284, and in this embodiment of the invention totals 8 characters selected from a 62-character alphabet, wherein each of parts 282 and 284 consists of 4 characters. The first part 282 is a primary key constant that is associated with an issuing unit (issuing unit code) and the second part 284 is a sequential 4-character string generated for the monitored object by the issuing unit.

Each portable unit 104 carries its own portable database that is a subset of the main database 12. Usually the contents of the portable database of the portable unit 104 is limited to a description of the objects that are located at one or several sites of the company/organization. The portable unit database 140 for certain periods of time exists independently, and for those periods of time the user can make changes related to the objects. As well, changes can be made to the same object records in the main database 12 or other portable unit databases 140. In order to avoid ambiguity in describing the same objects, the system synchronizes all of the databases. The synchronization process is independent of all application layer content. In one embodiment, the system provides for synchronization of the databases using three processes:

Portable unit processing;
Desktop processing; and
Server processing.

The portable unit 104 uses internal flags to keep track of every record changed, inserted or deleted since the last synchronization. On the server 100, a parameter record is kept for each issuing unit that records the date-time stamp of the last synchronization.

At synchronization, the portable unit 104 is linked to a desktop unit via a serial or USB port, for example. The flagged records on the portable unit 104 are uploaded into two transaction tables. These tables are defined in a data dictionary. The data dictionary describes the application tables and fields that are used during synchronization. A master table describes the tables and provides as a description two character codes that are used on the portable units 104, and a detail table contains one row for each attribute in any table that is described. The master table consists of two attributes, a table code and a table name. The detail table consists of the following attributes: table code, attribute code, attribute name and data type. These two tables are used to build dynamic SQL statements to retrieve download rows from any table that is mentioned in the master tables with identical WHERE clauses. Each row of the table selected for download is broken down into rows of data, one for each attribute in the detail table. The use of the master and detail tables provides an abstraction of the database schema from the synchronization process and, in addition, permits the selection of a subset of attributes for download from any of the tables. The use of a data dictionary also enables effective operations within the capabilities of the portable units 104 due to available memory and user interface capacity.

Figure 12:
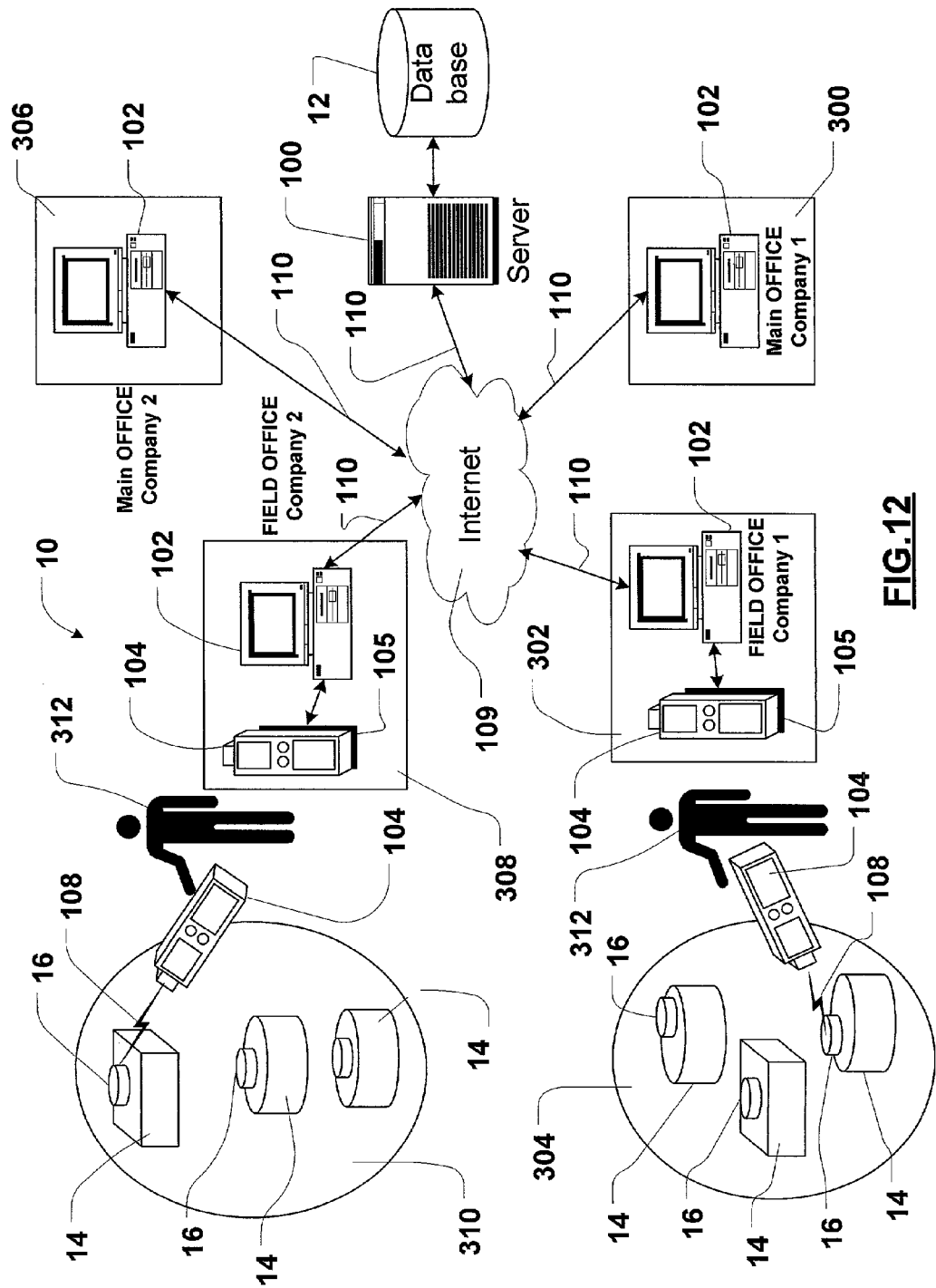
FIG. 12 is a schematic diagram of an exemplary implementation of the system shown in FIG. 1.

In one embodiment, the synchronization process is initiated when the user places the portable unit 104 in a docking cradle 105 (FIG. 12). Placing the portable unit 104 in the docking cradle 105 prompts the portable unit 104 to immediately start attempting to contact the synchronization application of the desktop computer 102 through the serial port. The records are uploaded by a transport layer of the frontend application 130 and are stored in a table on the desktop computer 102. After the upload is complete, the desktop synchronization conduit 132 (FIG. 6) connects with the server 100 to pass the synchronization table transactions to the, appropriate tables on the server 100. A coded form of the table name and all the fieldnames is sent with the records, so a data dictionary can be used to sort the data and apply the transactions to the proper tables. Each time a synchronization process is performed, a portable unit application revision number, last revision date, or any other suitable indicator, is also passed to the server 100. If any software patches or program revisions are available, they are downloaded to the portable unit 104 as a part of the synchronization process. Thus, the portable unit "clients" are always kept current and software distribution issues are resolved.

FIG. 12 illustrates exemplary relations and interactions within the object monitoring and management system 10. The system 10 provides a paperless, digital solution that maintains an entity asset list in a real time environment. In this particular example, two entities "company 1" and "company 2" are users of the system 10. The first entity "company 1" is represented by a desktop computer 102 in the main office 300, desktop computer 102 in the field office 302, portable units 104 and asset objects 14 that are located at the location 304 of the "company 1". Each of these objects 14 is equipped with a physically affixed computer readable tag 16.

The second entity "company 2" is represented by a desktop computer 102 in the main office 306, desktop computer 102 in the field office 308, and portable unit(s) 104 and asset objects 14 that are located at the location 310 of the "company 2". Each of these objects 14 is likewise equipped with a physically affixed computer readable tag 16. Each office 300, 302, 306 and 308 has an Internet connection 110 for using the Internet 109 to connect desktop computers 102 to the server 100, which has access to the database 12.

In order to track their assets, the personnel 312 of "company 1" and "company 2" identify objects 14 belonging to the respective companies using computer readable tags 16. The tags 16 store unique digital information that can be associated with the monitored objects in the portable database 140 and central database 12.

The company locations 304 and 310 can be out of range of wireless or wireline communication facilities, such as telephone networks, the Internet, radio or mobile telephone networks. Furthermore, objects 14 can be mobile or dispersed across a wide geographical area. For example, in the oil and gas industry, the equipment for exploration or for production is, for the most part, far from any communication facilities and some of it is frequently relocated.

Objects to be monitored and managed by the system must be identified by a computer readable tag 16. A tag 16 may be glued or otherwise secured to an accessible position on the object 14. The computer readable tags 16 can be affixed to objects 14 indoors or out-of-doors in a wide variety of environmental conditions. After the computer readable tag 16 is affixed to the object 14, the digital information contained in the tag 16 is read using the portable unit 104, which is a handheld computer. The handheld computer is a portable, lightweight version of a personal computer that can operate using a battery. The portable unit 14 runs applications, has a monitor, keyboard, memory and standard interfaces for communicating with other digital devices. In one embodiment, the portable unit 104 is configured to communicate with a desktop computer 102 in the field offices using a serial port connection.

In one embodiment, the computer readable tag 16 stores a 14-character universally-unique serial number on a chip encased in a stainless steel container that is very resistant to most forms of corrosion. The 14-character serial number can be read by the portable unit 104. The tag 16 is contacted using an interface of the portable unit 104 that is adapted to read the tag 16. The portable unit applies a small voltage to the tag and reads the serial number stored by the tag 16. After the serial number is read, an operator 312 may crate a record using a keyboard of the portable unit 16. The record may contain any desired information about the object 14, for example a detailed description of the object, a description of a location of the object, a digital photograph of the object, etc. Other information about of the object 14 may be entered in the field of office 302, in the main office 300, or by authorized third parties as will be explained below in more detail.

After the personnel 312 have completed the identification of the object 14 and have created the required records in the portable database, they may return to the field office and place the portable unit 16 in the docking station 105 that is connected to the desktop computer 102. The new data from the database of the portable unit is automatically transferred to the central database 12 maintained by the server 100 using the Internet 109. Consequently, the databases of the portable unit 16 and server 100 are synchronized and information about the object 14 becomes globally accessible for authorized users of the system. The authorized personnel 312 of the company that owns the object 14 as well as authorized third parties can modify the information about the object 14, or create new records related to the object 14.

When information about a particular object 14 is entered and stored in the database 12, that information is accessible for use by all company personnel having an issuing unit belonging to an issuing unit group associated with an attribute of the object 14. For example, in many industries, equipment must be periodically maintained or inspected. The personnel 312 who are responsible for maintenance and inspection use the system to identify any object that must be maintained or inspected. When an object 14 is identified as requiring maintenance or inspection, the personnel 312 at the field office download any required information into their portable unit 104, if necessary.

The personnel 312 use information about the object to locate that object 104 and to identify the particular object 104 that requires maintenance or inspection. Thereafter, the tag 16 is read to ensure that the object 14 has been correctly identified. Information about specific maintenance or inspection operations performed can be entered by the personnel 312 during the maintenance or inspection operation. After the personnel have returned to the field office and the portable unit 104 is placed in the docking station 105 connected to the desktop computer 102, any information about the maintenance work or inspection that was created or modified in the course of the work is transferred to the database 12.

Figure 13:
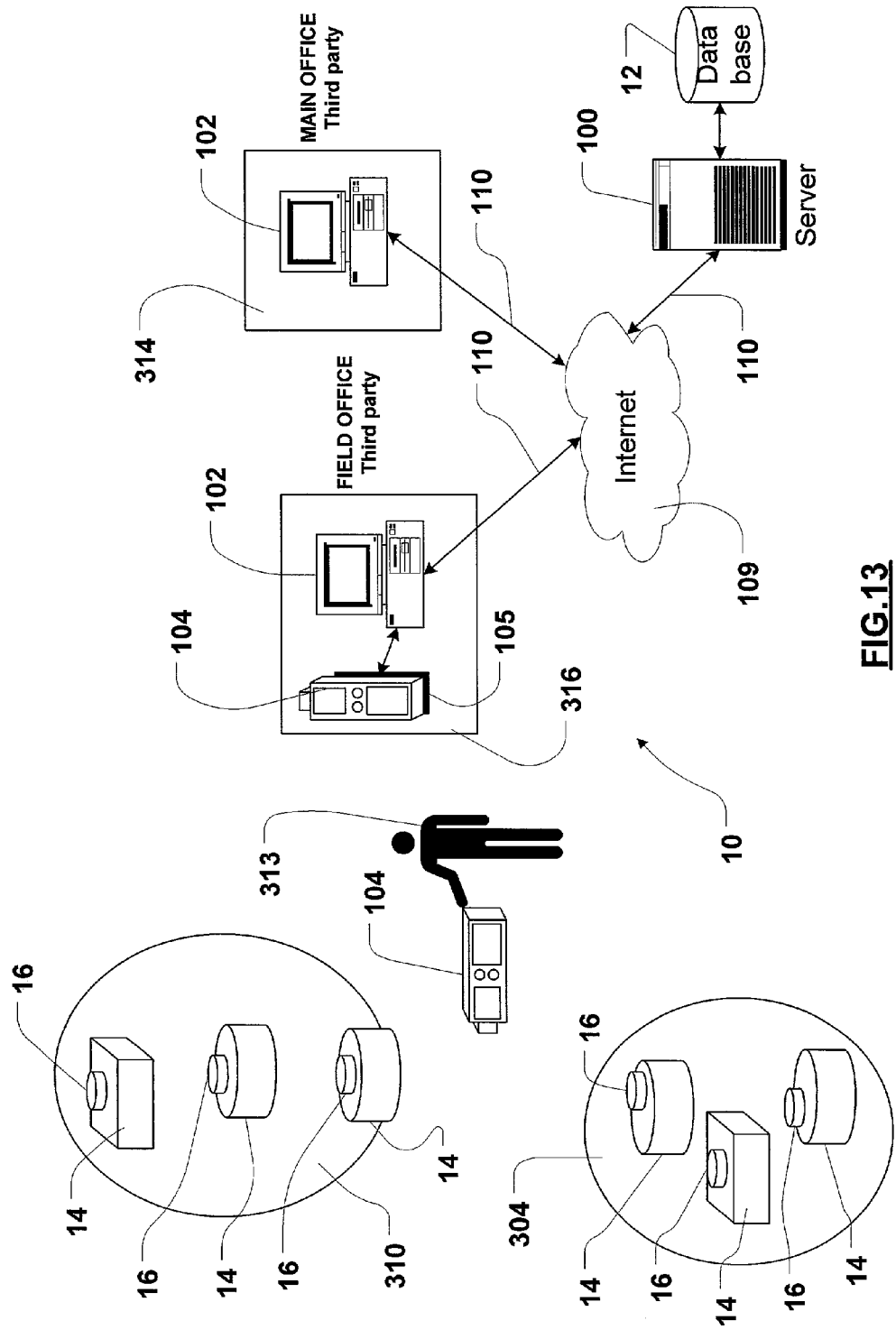
FIG. 13 is a schematic diagram illustrating how the exemplary implementation of the system shown in FIG. 12 is used by service providers, regulators, etc.

In addition, companies/organizations that are users of the system can authorize third parties to access to their information in the database 12. The third party, as described below, can be any individual, public or private company or regulatory agency. An example illustrated in FIG. 13 shows how the object monitoring and management system is used by a third party 313. The third party 313 is authorized by one or more companies/organizations that use the system to access a subset of the information in the database 12 associated with the respective company/organization. The third party 313 is granted access only to records related to an area of responsibility of the third party.

In this example, the third party 313 has desktop computers 102 in a main office 314 and a field office 316. As explained above, each object 14 owned by the respective companies at the locations 304 and 310. Each object 14 at the location 304 and 310 is identified by a computer readable tag 16. The objects 14 at the location 304 are owned by "company 1" and the objects 14 at the location 310 are owned by "company 2". Companies 1 and 2 define issuing unit groups that permit the third party 313 to use the system. The third party 313 may be, for example, a regulatory agency such as an Environmental Protection Agency, or a safety board that is responsible for regulating operations or inspecting equipment of "company 1" and "company 1".

The third party 313 may, for example, periodically query the central database 12 to determine the objects that require maintenance or inspection and download to the portable unit 104, a subset of database 12 that contains information about objects 14 to be inspected. The third party personnel 313 then use the remote database of the portable unit 104 to identify the location of an object 14, confirm an identity of the object 14 by reading the tag 16, and enter information relevant to the maintenance or inspection of the object when the personnel 313 return to the field office 316 and place the portable unit 104 into a docking station 105. The information is automatically transferred to the database 12 via the connection 110 with the Internet 109.

Figure 14:
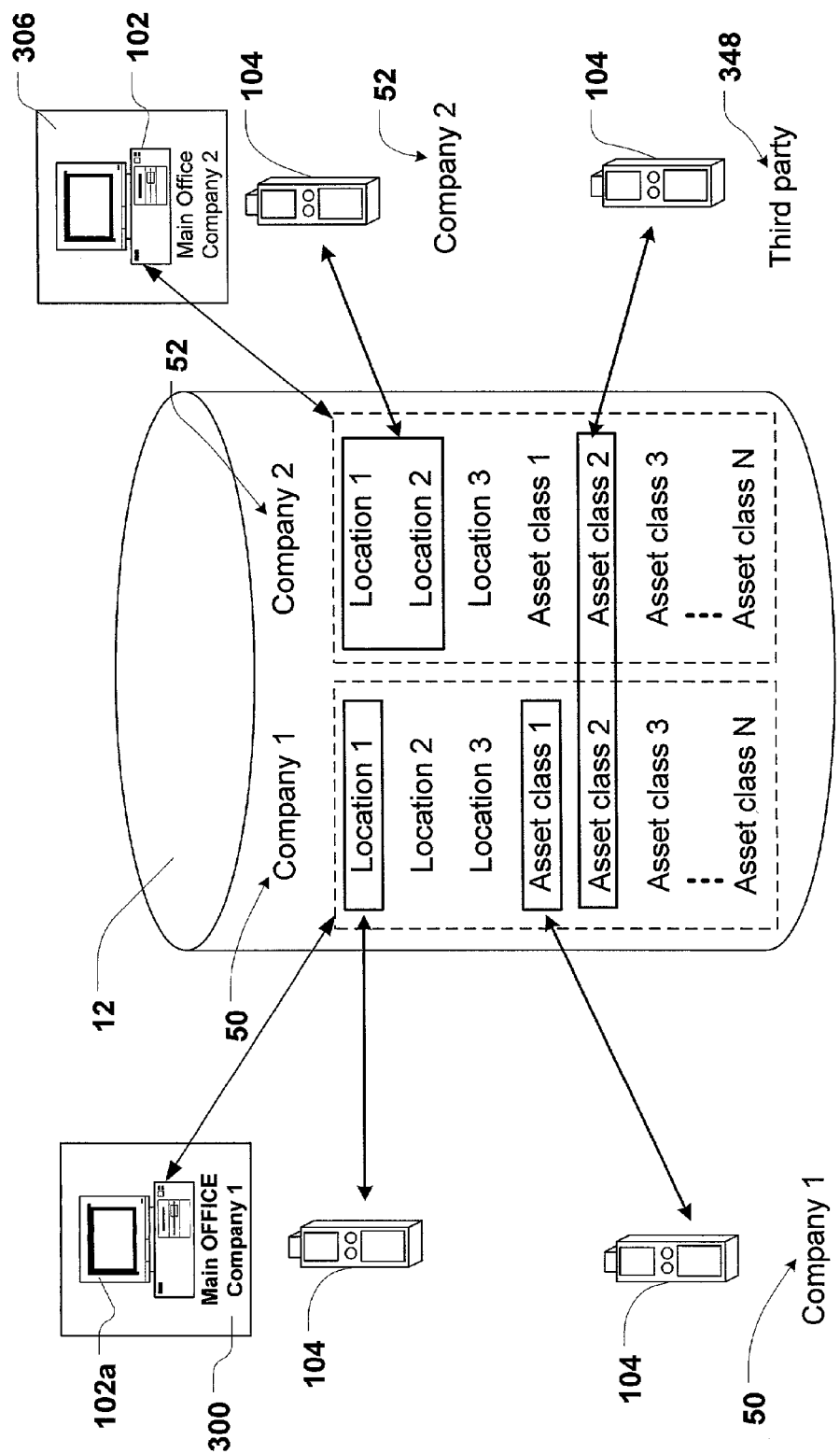
FIG. 14 is a schematic diagram illustrating how entities can partition data in a central database structured in accordance with the invention.

FIG. 14 schematically illustrates the partitioning of the database 12. Access to information in the database 12 is controlled by each company/organization, which partitions the data to control access in any way desired. The company/organization partitions the data using an interface dialog that permits data access groups, referred to as Issuing Unit Groups (IUGroups) to be defined, or selected from a list of predefined IUGroups. Issuing Units are physical or logical devices commissioned to generate primary keys, as described above. Each Issuing Unit, such as a portable Unit 14, can belong to one and only one IUGroup. An Issuing Unit can be decommissioned and recommissioned to a different IUGroup. The purpose of the IUGroup is to abstract the partitioning of the information in database 12 away from the Issuing Units. This permits multiple Issuing Units to access the same subset of the database 12. The association of IUGroups to objects 14 is a many-to-many relationship. Consequently, a single IUGROUP can be associated with any object 14, and an object 14 can be associated with more than one IUGROUP. This permits a company/organization to partition the information in database 12 related to objects 14 that it owns along different lines.

After an IUGroup is selected using the interface dialog as described above, the company/organization user selects multiple instances of an object class to be associated with the IUGroup. The system 10 then creates corresponding entries in the IUBObjectXREF table 214 that associate the respective object instances with the respective IUGROUPs by writing two ObjectId values in each row, IUGObjectId 236 AND XREFObjectId 228 (FIG. 9). Since all primary keys in each of the object classes are identical in format, the system 10 can associate any object class with any IUGroup within the same IUObjectXREF table 214. A reference in table 214 to OrgId is unnecessary because the Issuing Units are assigned unique primary key constants that are independent of OrgId. However, the IUGroup table 212 (FIG. 9) has a reference to a foreign key to OrgId.

Issuing Units, including portable units 104a-d, belong to one and only one Issuing Unit Group (IUGroup). The IUGroup controls the way in which data in the database 12 is partitioned, and therefore controls the subset of database 12 that is synchronized with each portable unit 104a-d. In the example shown in FIG. 14, the Issuing Units are the desktop computers 102a,b and portable units 104a-d, however, it should be understood that the same principles apply to any Issuing Unit. One of the portable units 104a that is operated by company 50 (company 1) is synchronized with data related to objects 14 in Location 1, while portable unit 104b of company 50 is synchronized with information related to objects 14 in Asset class 1 owned by company 50. The portable unit 104c of company 2, is synchronized with information related to all objects 14 in Locations 1 and 2. On the other hand, the portable unit 104d used by third party 348 is synchronized with information in Asset Class 2 related to objects belonging to both companies 1 and 2.

Several tables in the database 12, for example, "ASSET", "Location" and "MATERIAL TRANSFER", include an attribute that is, or is associated with, the unique serial number that is stored in the computer readable identification tag 16. For the tables "ASSET" and "Location", the unique serial number stored by the identification tag 16 is the only identifying attribute. However, in these tables, as with any other table in the database, a primary key is the attribute "OBJECTID". To associate the unique identification number with a specific object, the system maintains a table "BUTTONREGISTRY".

Table 3 is an example of the "BUTTONREGISTRY" table.

TABLE 3

"BUTTONREGISTRY".

| Name | Characteristics |
| --- | --- |
| ObjectId | character (10) |
| ButtonId | character (16) |
| TableCode | character (12) |

The attribute "Objectid" is a primary key of the object to which the identification tag 16 is affixed. The attribute "TableCode" is a reference to a table where the "ObjectId" can be found; and the attribute "BUTTONID" is the unique serial number stored by the identification tag 16.

When portable unit reads an identification tag 16, the portable unite first looks for the attribute "BUTTONID" in the "BUTTONREGISTRY" table to find out which table stores the details of the object description. Then the system retrieves information from that table using the attribute "BUTTONID", to retrieve the with the description of the object 14.

Because the system 10 permits third parties to have access on a cross-entity basis to selected subsets of information in the database 12, it is sometimes necessary for a third party organization to superimpose a different hierarchical structure on data in the database 12 than that imposed by the respective companies/organizations that own the objects 14. This may be necessary if the third party requires its own location tree to control data partitioning to portable units 104. For example, a regulatory agency may require data partitioning of information related to a set of objects 14 by regions that do not correspond to locations used by the object owners, because the regulatory agency has inspection districts that encompass two or more owner locations, or the like. Consequently, the regulatory agency may need to create its own hierarchical structure of regions and districts, by which it organizes references to the objects 14. This requires that the object 14 have two "parents" locations, one location being defined by the object owner, and another one by the regulatory agency. In order to avoid ambiguity in location description, one embodiment of the system 10 uses a LocationXREF table that stores the parent-child relationship separately. The LocationXREF table consists of two main attributes "LocationobjectId" and "LocationParentObjectId". For any one value of an attribute "LocationObjectId", more than one row can be stored for a value of the attribute "LocationParentObjectId". The same principal can be applied to other attributes of the database 12, in order to accommodate any situation that may need to be accommodated between the parties having access to subsets of information in the database 12.

Consequently, the system 10 enables a completely paperless process for asset or process management. The system 10 permits an application service provider (ASP) to provide paperless asset or process management to a plurality of unrelated companies/organizations. Each company/organization perceives an exclusive database that can be partitioned in any convenient way to control access to information. At the same time, third party service providers, regulatory authorities, and the like can be granted access to information required for their respective functions, and permitted to create new data in the database required to support the paperless process without compromising the confidentiality or security of other data in the database 12.

The system 10 has been described with reference to portable units 14 that are synchronized in a batch process and are not adapted for wireless communications with the server 100, in order to support operations in remote areas where wireless services are unavailable, unreliable, or too expensive. It should be understood, however, that the invention is equally adapted to use with portable units 104 that have wireless communications capability, in which case synchronization could be a dynamic process conducted on a transaction basis.

The embodiments of the invention described above are therefore intended to be exemplary only, the scope of the invention being limited solely by the scope of the appended claims.

We claim:

1. An object monitoring and management system for managing objects possessed by each one of a plurality of operating entities, the system comprising:
    a central database for storing information about each object, the central database enabling each operating entity to retrieve, write and modify the information about objects that the operating entity possesses;
    an interface for permitting each operating entity to:
        create data access groups;
        register selected ones of a plurality of portable units with each data access group; and
        associate each data access group with a selected subset of the information about objects owned by the operating entity, such that each portable unit that is registered with a given data access group is enabled to access only the respective subset of the information associated with that data access group;
    wherein each portable unit:
        maintains a respective portable database for storing a local copy of the respective subset of the information associated with the data access group to which the portable unit is registered;
        permits a user to at least create new records in the respective portable database for storing information about new objects; and
        issues a respective new object identifier for each new object, the new object identifier being assigned to the corresponding new record and including a first character string uniquely associated with the portable unit and a second character string generated by the portable unit, the second character string being unique across at least the new object identifiers issued by the portable unit, such that each new object identifier is unique across the central database; and
    connection means for synchronizing the respective portable database of each portable unit with the central database.

2. The system as claimed in claim 1 wherein the central database is connected to an open network via a gateway that enables secure access to the central database governed by at least one attribute associated with each object.

3. The system as claimed in claim 2 wherein the connection means for synchronizing the portable database with the central database comprises a link between the portable unit and the open network for communication with the gateway.

4. The system as claimed in claim 3 wherein the link includes a connection to a desktop computer that comprises conduit software for interacting with the portable unit and the central database using the open network, to synchronize the portable database with the central database by exchanging information between the portable unit and the central database.

5. The system as claimed in claim 4 wherein each portable unit further comprises program code for initiating communications with the desktop computer whenever the portable unit is linked to the desktop computer, to synchronize the portable unit database with a corresponding subset of the central database.

6. The system as claimed in claim 5 wherein each portable unit further comprises conduit software for communicating with the desktop computer to synchronize the portable unit database with the corresponding subset of the central database.

7. The system as claimed in claim 2 wherein the open network is the Internet.

8. The system as claimed in claim 1 wherein the object identifier is used as a primary key for identifying each record in the central database pertaining to any given object.

9. The system as claimed in claim 1 wherein each portable unit comprises program code for flagging records that are created, deleted or modified in the portable database.

10. The system as claimed in claim 1 wherein each record of the central database comprises a respective timestamp that indicates when each record was last modified.

11. The system as claimed in claim 1 wherein the central database further comprises a respective last download timestamp associated with each portable unit.

12. The system as claimed in claim 1 wherein the central database further comprises a table for storing registration information about each portable unit.

13. The system as claimed in claim 1 wherein each object is identified by a respective unique computer-readable identifier.

14. The system as claimed in claim 13 wherein each portable unit reads the computer-readable identifier.

15. The system as claimed in claim 13 wherein the computer readable identifier comprises any one or more of:
    a chip or electronic tag that stores a unique serial number;
    a printed bar code; and
    a radio frequency identification (RFID) tag.

16. A computer implemented method for enabling paperless management and tracking of physical assets or other objects in the possession of a plurality of operating entities, the method comprising:
    providing a central database for storing information about each object, the central database enabling each operating entity to retrieve, write and modify the information about objects that the operating entity possesses;

providing a user interface that permits each operating entity to:

define data access groups;

register selected ones of a plurality of portable units with each data access group; and associate each data access group with a selected subset of the information about objects owned by the operating entity, such that each portable unit that is registered with a given data access group is enabled to access only the respective subset of the information associated with that data access group;

wherein each portable unit:

maintains a respective portable database for storing a local copy of the respective subset of the information associated with the data access group to which the portable unit is registered;

permits a user to view, modify and at least create new records in the respective portable database for storing information about new objects; and issues a respective new object identifier for each new object, the new object identifier being assigned to the corresponding new record and including a first character string uniquely associated with the portable unit and a second character string generated by the portable unit, the second character string being unique across at least the new object identifiers issued by the portable unit, such that each new object identifier is unique across the central database; and providing connection means for synchronizing the respective portable database of each portable unit with the central database.

17. The method as claimed in claim 16 further comprising using a respective organization identifier of each operating entity as an object attribute in the central database, such that users associated with any given operating entity is enabled to access only records in the database containing information related to the objects in the possession of that operating entity.

18. The method as claimed in claim 16 further comprising a step of identifying each of the objects by affixing a computer readable identifier to the each of the respective objects.

19. The method as claimed in claim 16 further comprising using the object identifier as a primary key for identifying each record in the central database pertaining to any given object.

20. The method as claimed in claim 16 wherein the at least one attribute comprises a respective organization identifier of each operating entity, such that users associated with any given operating entity are enabled to access only records in the database containing information related to the objects in the possession of that operating entity.

21. The method as claimed in claim 16, wherein the connection means for synchronizing the respective portable database of each portable unit with the central database comprises software code of the central database for:

creating, for each new record in the portable database, a corresponding set of new records in the central database, the set of new records encompassing all of the information about objects stored in the central database;

assigning the respective object identifier of each new record in the portable database to a primary key of the corresponding set of new records in the central database; and copying the information stored in each new record in the portable database to the corresponding set of new records in the central database.

* * * * *